(12) United States Patent
Shimizu et al.

(10) Patent No.: US 8,979,167 B2
(45) Date of Patent: Mar. 17, 2015

(54) VEHICLE DOOR FRAME STRUCTURE

(71) Applicant: Shiroki Corporation, Kanagawa (JP)

(72) Inventors: Kenji Shimizu, Kanagawa (JP);
Shigenobu Ohsawa, Kanagawa (JP);
Jiro Yoshihara, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 13/945,442

(22) Filed: Jul. 18, 2013

(65) Prior Publication Data
US 2014/0021739 A1   Jan. 23, 2014

(30) Foreign Application Priority Data

Jul. 18, 2012 (JP) ................................. 2012-159365

(51) Int. Cl.
*B60J 5/00* (2006.01)
*B60J 5/04* (2006.01)

(52) U.S. Cl.
CPC . *B60J 5/04* (2013.01); *B60J 5/0402* (2013.01)
USPC ........................ 296/146.2; 296/146.5; 49/502

(58) Field of Classification Search
CPC ....... B60J 5/0401; B60J 5/0402; B60J 5/0406
USPC .............. 296/146.5, 146.2; 49/502, 374, 348, 49/349
See application file for complete search history.

(56) References Cited

U.S. PATENT DOCUMENTS

| 4,514,613 A * | 4/1985 | Hill et al. ................. 219/121.13 |
| 6,039,384 A * | 3/2000 | Schulte et al. ............. 296/146.2 |
| 8,172,125 B2 * | 5/2012 | Okada et al. ................... 228/135 |

FOREIGN PATENT DOCUMENTS

JP    2003 112525    4/2003

OTHER PUBLICATIONS

Aisin Seiki Co Ltd., "Manufacturing method of door frame for automobile," Patent Abstracts of Japan, Publication Date: Apr. 15, 2003; English Abstract of JP-2003 112525.

* cited by examiner

*Primary Examiner* — Dennis H Pedder
(74) *Attorney, Agent, or Firm* — Millen, White, Zelano & Branigan, P.C.

(57) ABSTRACT

A door frame structure of a vehicle door which includes an upright pillar sash and an upper sash, wherein joining end surfaces of the upright pillar sash and the upper sash are welded together along a periphery thereof, at least one of the upright pillar sash and the upper sash includes a frame body portion and a cantilever protrusion, the joining end surface of the one of the upright pillar sash and the upper sash partly including the frame body portion and the cantilever protrusion. The upright pillar sash and the upper sash are welded to each other along the frame body portion and a base portion of the cantilever protrusion which is connected to the frame body portion. A leading end portion of the cantilever protrusion which is positioned on the leading end side is not welded.

15 Claims, 11 Drawing Sheets

VEHICLE DOOR FRAME STRUCTURE

BACKGROUND OF THE INVENTION

1. Field of the Invention

The present invention relates to a door frame structure of a vehicle door, and in particular to a joining structure between an upright pillar sash extending in the vertical direction of the door and an upper sash, which forms the upper edge of the door, the upright pillar sash and the upper sash being butted and joined together by welding.

2. Description of Related Art

A vehicle door frame in which opposed end surfaces of an upright pillar sash (side sash) extending in the vertical direction of the door and an upper sash, which forms the upper edge of the door, are butted and joined together by welding in the door corner portion at the upper end of the upright pillar sash, is known in the art (disclosed in, e.g., Japanese Unexamined Patent Publication 2003-112525). This welding is performed along the periphery of the joined end surfaces of the upright pillar sash and the upper sash to form a butt-weld there along.

The door frame has a tubular portion having a closed cross sectional shape to secure sufficient rigidity, so that an excessive deformation or damage due to high temperatures generated at the time of welding does not easily occur at the tubular portion. On the other hand, if the joined end surfaces of the upright pillar sash and the upper sash in the door corner portion include a thin-walled protrusion or the like, high heat generated at the time of welding increases the risk of burn-through.

SUMMARY OF THE INVENTION

The present invention has been devised in view of the above described problems of the prior art and provides a vehicle door frame structure which is superior in prevention of damage to the door frame during welding operation in a vehicle door frame in which welding is performed along the periphery of the joined end surfaces of the upright pillar sash and the upper sash in a door corner portion.

According to an aspect of the present invention, a door frame structure of a vehicle door is provided, which includes an upright pillar sash that extends in a substantially vertical direction and an upper sash that forms an upper edge of the vehicle door, wherein joining end surfaces of the upright pillar sash and the upper sash are butted and joined together by welding along a periphery of the joining end surfaces, wherein at least one of the upright pillar sash and the upper sash includes a frame body portion, and a cantilever protrusion which protrudes from the frame body portion so that a leading end of the cantilever protrusion is a free end, the joining end surface of the one of the upright pillar sash and the upper sash partly including the frame body portion and the cantilever protrusion. The upright pillar sash and the upper sash are welded to each other along the frame body portion and a base portion of the cantilever protrusion which is connected to the frame body portion. A leading end portion of the cantilever protrusion which is positioned on the leading end side is not welded.

It is desirable for the leading end portion to be a narrow width portion, and the base portion to be a width widening portion which increases in wall thickness from the narrow width portion toward a portion of the cantilever protrusion which is connected to the frame body portion.

The present invention is especially suitable for the case in which at least one of the upright pillar sash and the upper sash that includes the cantilever protrusion is made of aluminum.

It is desirable for the frame body portion to include a tubular portion having a closed cross sectional shape.

The cantilever protrusion can be given an arbitrary function; for instance, the cantilever protrusion can constitute an element of a weather strip retaining portion which retains a weather strip that is supported on a rim of the door frame.

The cantilever protrusion can be provided on either the upright pillar sash or the upper sash. For instance, the cantilever protrusion can be provided on the upper sash.

The above described vehicle door frame structure according to the present invention can improve the effect of preventing damage to the door frame when welding is performed along the periphery of the joined end surfaces of the upright pillar sash and the upper sash in a door corner portion.

The present disclosure relates to subject matter contained in Japanese Patent Application No. 2012-159365 (filed on Jul. 18, 2012) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
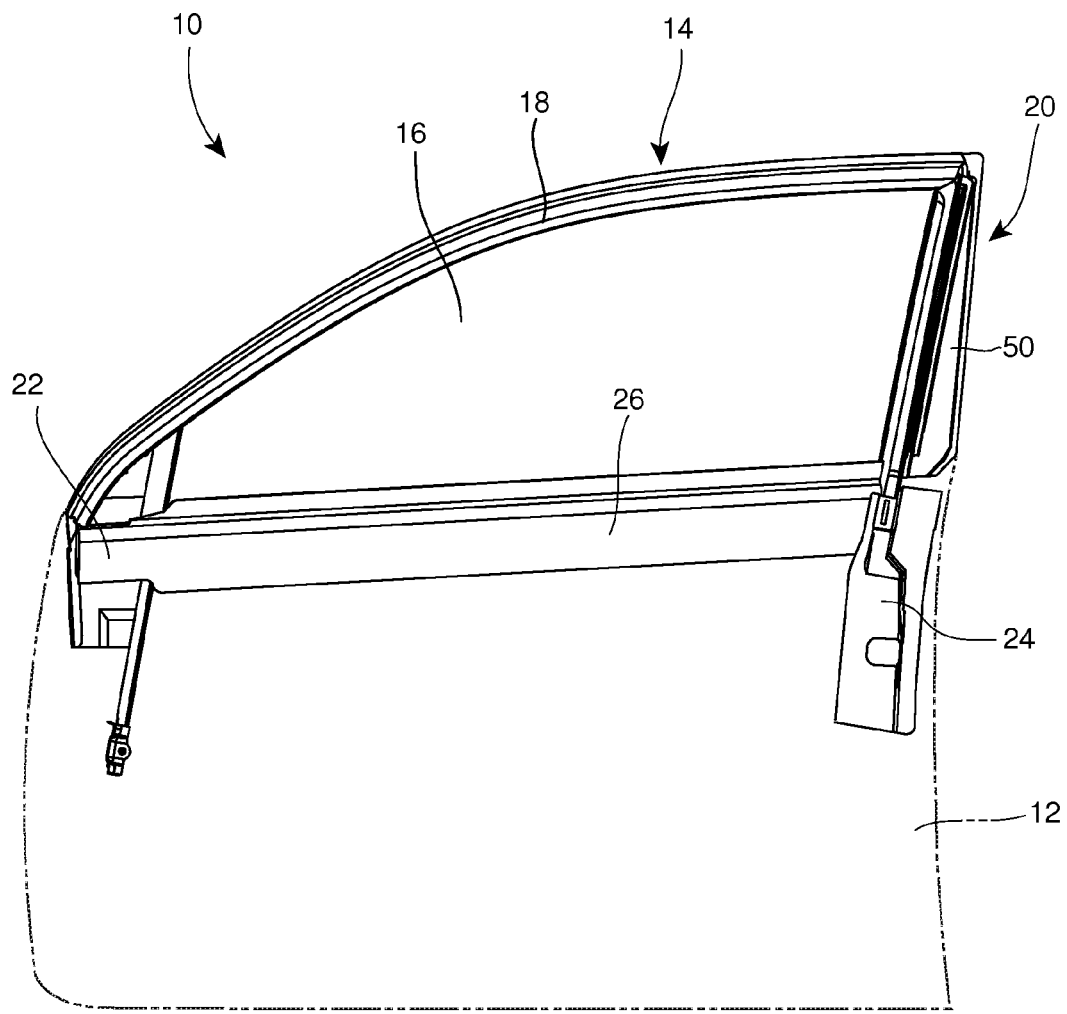
FIG. 1 is side elevational view of a motor-vehicle side door for use as a front-seat door, to which a vehicle door frame structure according to the present invention has been applied, viewed from the vehicle interior side.

FIG. 1 shows a motor-vehicle side door 10 for use as a front-seat door. The door 10 is provided with a door panel 12 (the outline of which is shown by a two-dot chain line) and a door frame 14 which is formed into a frame on top of the door panel 12. A window pane (not shown) moves up and down in a window opening 16, which is surrounded by the upper edge of the door panel 12 and the inner edge of the door frame 14. A glass run (not shown) made of an elastic material is installed in the inner peripheral side of the door frame 14 that faces the window opening 16, and an edge of the window pane is held by the glass run.

The door frame 14 is provided with an upper sash 18 which forms the upper edge of the door 10 and an upright pillar sash (side sash) 20 which is formed to extend substantially vertical from the rear of the door panel 12. The rear end of the upper sash 18 and the upper end of the upright pillar sash 20 are joined together in a door corner portion (specifically, the upper right corner portion with respect to FIG. 1). The door panel 12 is made by combining an outer panel on the vehicle exterior side and an inner panel on the vehicle interior side. The front lower part of the upper sash 18 is fixed to the inner panel via a mirror bracket 22, while the lower part of the upright-wall sash 20 is fixed to the inner panel via a lock bracket 24. The door 10 is provided with a belt line reinforcement 26 which extends in the vehicle forward/rearward direction (horizontal direction with respect to FIG. 1) and is fixed at the front and rear ends thereof to the mirror bracket 22 and the lock bracket 24, respectively. When the door 10 is closed, the upper sash 18 is positioned along the associated lateral side edge of a roof panel (not shown) of a vehicle body (in other words, along the upper edge of the associated door opening of a vehicle body), while the upright pillar sash 20 is positioned along the adjacent center pillar (not shown) of the vehicle body. A weather strip (not shown) is installed onto the outer periphery of the upper sash 18 and the upright pillar sash 20. This weather strip is elastically deformed to make the gap between the door 10 and the vehicle body watertight. In the following descriptions, the side of the door frame 14 that faces the window opening 16 will be referred to as the "inner peripheral side", and the other side of the door frame 14 which faces the door opening of the vehicle body (i.e., the opposite side of the door frame 14 from the inner peripheral side) will be referred to as the "outer peripheral side". In addition, terms indicating a direction such as the "front", "rear", "up", "down", "vehicle interior side" and "vehicle exterior side", will be mentioned in the following descriptions to designate directions determined with reference to the vehicle body, to which the door 10 that is for use as a front-seat door is attached.

Figure 4:
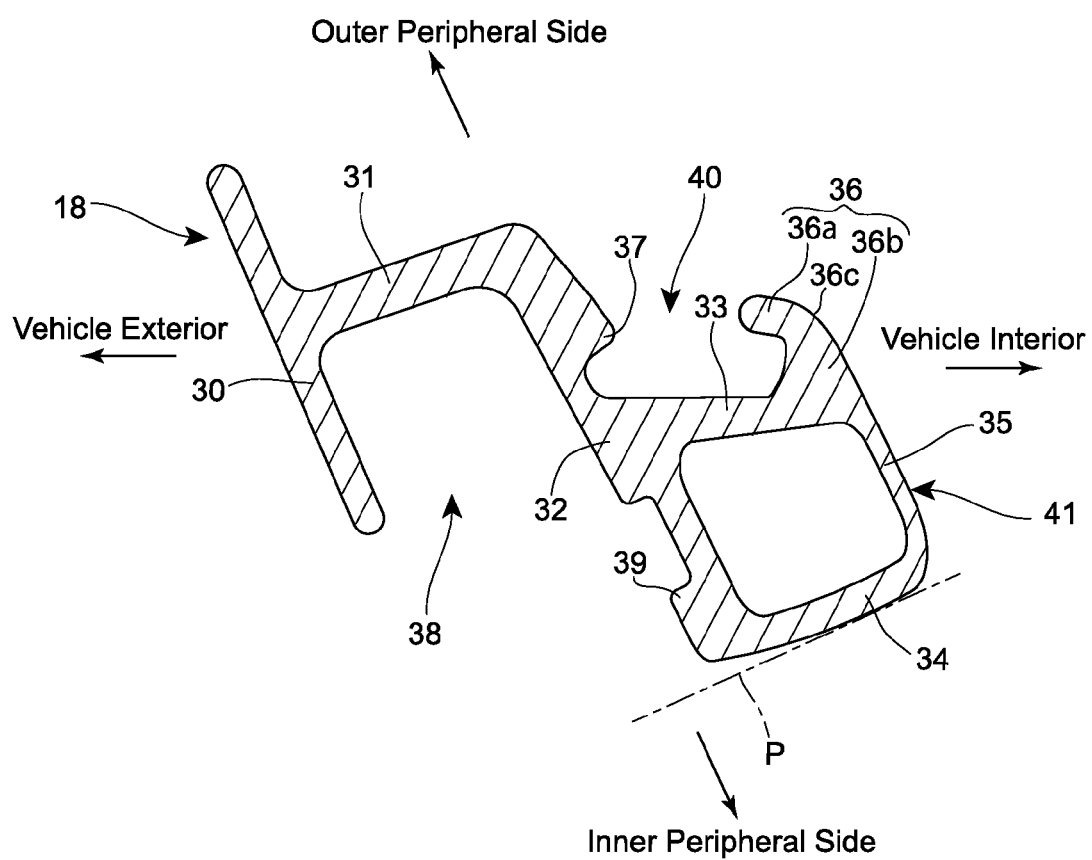
FIG. 4 is a cross sectional view of the upper sash taken along the line IV-IV shown in FIG. 2.

The upper sash 18 is composed of an integrally-formed elongated member; in this particular embodiment, the upper sash 18 is formed as an aluminum extruded product. As shown in FIG. 4, the upper sash 18 is provided with a vehicle exterior side wall 30, a glass-run retaining base wall 31, a central wall 32, a weather strip retaining base wall 33, an inner peripheral wall 34, a vehicle interior side wall 35, a cantilever protrusion 36 and a retaining stepped portion 37. The vehicle external side wall 30 is positioned on the vehicle exterior side, the glass-run retaining base wall 31 extends toward the vehicle interior from the vehicle exterior side wall 30, and the central wall 32 extends toward the inner peripheral side from the glass-run retaining base wall 31. The weather strip retaining base wall 33 and the inner peripheral wall 34 extend toward the vehicle interior from the central wall 32. The vehicle interior side wall 35 connects the weather strip retaining base wall 33 and the inner peripheral wall 34. The cantilever protrusion 36 protrudes toward the outer peripheral side from the boundary between the weather strip retaining base wall 33 and the vehicle interior side wall 35 and bends toward the vehicle exterior side. The retaining stepped portion 37 is positioned to face the vehicle exterior side of the cantilever protrusion 36 and projects toward the vehicle interior from the central wall 32. An exterior member (garnish molding) not shown in the drawings is fixed to the vehicle exterior wall 30.

A portion of the upper sash 18 which is surrounded by the vehicle exterior side wall 30, the glass-run retaining base wall 31 and the central wall 32 constitutes a glass-run retaining portion 38 in which the aforementioned glass run (not shown) is fitted and retained. The glass-run retaining portion 38 has a bottomed box shape which is open at the inner peripheral side. The central wall 32 is provided on a portion thereof with a retaining stepped portion 39 which is used to retain the glass run held in the glass-run retaining portion 38.

A portion of the upper sash 18 which is surrounded by the central wall 32, the weather strip retaining base wall 33, the vehicle interior side wall 35, the cantilever protrusion 36 and the retaining stepped portion 37 constitute a weather strip retaining portion 40, in which the aforementioned weather strip (not shown) is fitted and retained. The weather strip retaining portion 40 has a bottomed box shape which is open at the outer peripheral side, and the weather strip is prevented from coming off the weather strip retaining portion 40 by the cantilever protrusion 36 and the retaining stepped portion 37.

A portion of the upper sash 18 which is surrounded by the central wall 32, the weather strip retaining base wall 33, the inner peripheral wall 34 and the vehicle interior side wall constitutes a rectangular-tubular (rectangular hollow-section) main frame portion (frame body portion) 41 having a hollow section.

Figure 3:
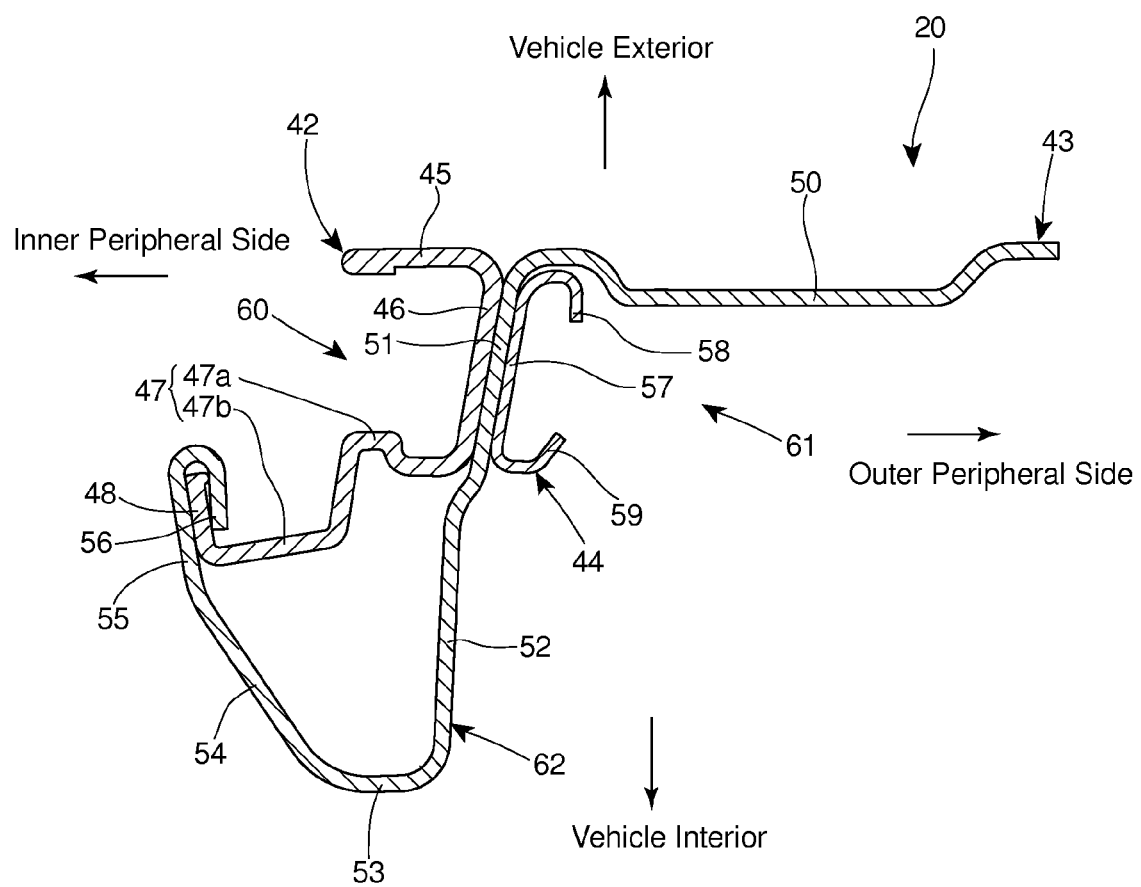
FIG. 3 is a cross sectional view of the upright pillar sash taken along the line III-III shown in FIG. 2.

As shown in FIG. 3, the upright pillar sash 20 is composed of a glass run channel 42, an outer member 43 and a weather strip channel 44 which are combined together. The glass run channel 42 is an elongated member made of aluminum which is formed by extrusion or roll forming. The glass run channel 42 is provided with a vehicle exterior side wall 45, a glass-run retaining base wall 46, a vehicle interior side wall 47 and a clamped portion 48. The vehicle exterior side wall 45 is positioned on the vehicle exterior side, the glass-run retaining base wall 46 extends toward the vehicle interior from the outer peripheral side end of the vehicle exterior side wall 45, the vehicle interior side wall 47 extends toward the inner peripheral side from the glass-run retaining base wall 46, and the clamped portion 48 is formed by bending the inner peripheral side end of the vehicle interior side wall 47 toward the vehicle exterior. The vehicle interior side wall 47 is provided with an outer peripheral side wall portion 47a which faces the vehicle exterior side wall 45, and an inner peripheral side wall portion 47b which does not face the vehicle exterior side wall 45. The inner peripheral side wall portion 47b is positioned closer to the vehicle interior than the outer peripheral side wall portion 47a. The end (upper end with respect to FIG. 3) of the clamped portion 48 substantially lies on a line extended from the outer peripheral side wall portion 47a toward the inner peripheral side.

The outer member 43 is an elongated member made of aluminum which is formed by press forming. The outer member 43 is provided with a vehicle exterior side wall 50, a base wall 51, a weather strip contacting wall 52, a vehicle interior side wall 53, an inclined wall 54, an inner peripheral wall 55 and a folded back portion 56. The vehicle exterior side wall 50 is positioned on the vehicle exterior side. The base wall 51 extends toward the vehicle interior from the inner peripheral side end of the vehicle exterior side wall 50. The weather strip contacting wall 52 extends toward the vehicle interior from the base wall 51. The vehicle interior side wall 53 extends toward the inner peripheral side from the vehicle interior side end of the weather strip contacting wall 52. The inclined wall 54 is inclined toward the inner peripheral side in a direction away from the vehicle interior side wall 53 toward the vehicle exterior side. The inner peripheral wall 55 is angled relative to the inclined wall 54 and extends toward the vehicle exterior side. The folded back portion 56 is formed by folding back the vehicle exterior side end of the inner peripheral wall 55.

The glass run channel 42 and the outer member 43 are fixed to each other by overlaying the base wall 51 on the outer peripheral side of the glass-run retaining base wall 46 and welding these overlaid portions to each other. The glass run channel 42 and the outer member 43 are also fixed to each other by the process of hemming, in which the clamped portion 48 is clamped by the folded back portion 56 to be tightly fixed thereto.

The weather strip channel 44 is provided with a weather strip retaining base wall 57 which is fixed to the outer peripheral side of the base wall 51 by welding or the like and a pair of retaining lugs 58 and 59 which project toward the outer peripheral side from the vehicle exterior side end and the vehicle interior side end of the weather strip retaining base wall 57, respectively. The weather strip channel 44 is made of aluminum and formed by press forming or roll forming.

A portion of the upright pillar sash 20 which is surrounded by the vehicle exterior side wall 45, the glass-run retaining base wall 46 and the vehicle interior side wall 47 of the glass run channel 42 constitutes a glass-run retaining portion 60, in which the aforementioned glass run (not shown) is fitted and retained. The glass-run retaining portion 60 has a bottomed box shape which is open to the inner peripheral side.

A portion of the upright pillar sash 20 which is surrounded by the vehicle exterior side wall 50, the base wall 51 and the weather strip contacting wall 52 of the outer member 43 constitutes a weather strip retaining portion 61, in which the aforementioned weather strip (not shown) is fitted and retained therein. The weather strip is prevented from coming off the weather strip retaining portion 61 by the pair of retaining lugs 58 and 59 of the weather strip channel 44. When the door 10 is closed, a portion of the weather strip comes into contact with the weather strip contacting wall 52.

A portion of the upright pillar sash 20 which is surrounded by the vehicle interior side wall 47 of the glass run channel 42, and the weather strip contacting wall 52, the vehicle interior side wall 53, the inclined wall 54 and the inner peripheral wall 55 of the outer member 43 constitutes a rectangular-tubular (rectangular hollow-section) main frame portion 62 having a hollow section. The cross sectional shape of the main frame portion 62 varies depending on the vertical position of the upright pillar sash 20, and the amount of projection of each of the weather strip contacting wall 52, the inner peripheral wall 55 and the inclined wall 54 toward the vehicle interior increases in the downward direction. Namely, the main frame portion 62 progressively increases in size toward the vehicle interior with respect to a downward direction. The main frame portion 62 has a cross sectional shape which is open toward the vehicle exterior at any cross-sectional position with respect to the lengthwise direction of the upright pillar sash 20, and the distance between the outer peripheral side wall of the outer member 43 that is composed of the base wall 51 and the weather strip contacting wall 52, and the inner peripheral side wall of the outer member 43 that is composed of the inclined wall 54 and the inner peripheral wall 55, increases in a direction away from the vehicle inner side wall 53 toward the vehicle exterior.

An exterior member (garnish molding) not shown in the drawings is fixed to the vehicle exterior side wall 45 of the glass run channel 42 and the vehicle exterior wall 50 of the outer member 43. As shown in FIG. 1, the vehicle exterior side wall 50 of the upright pillar sash 20 progressively increases in width with respect to a downward direction.

Figure 2:
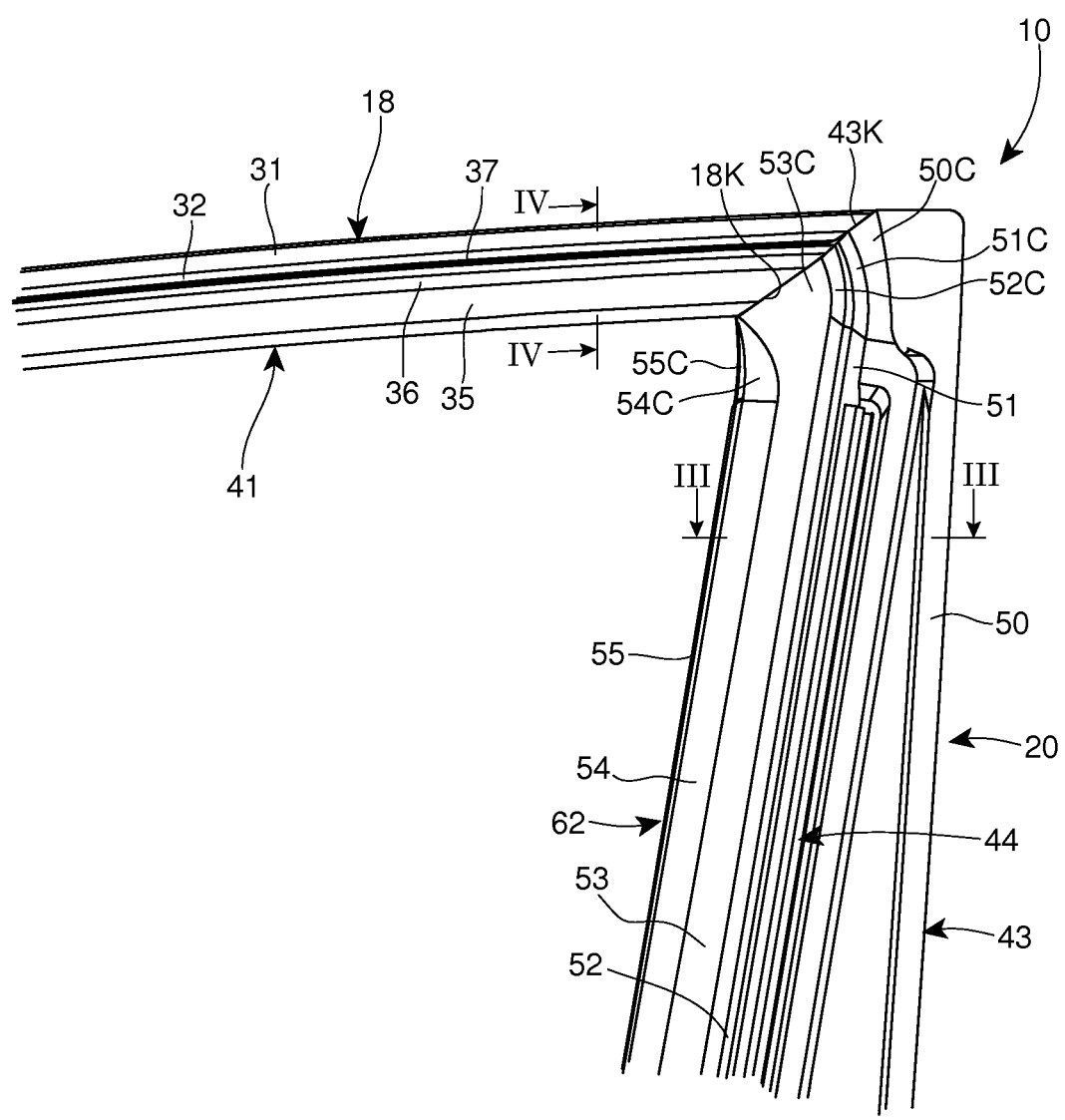
FIG. 2 is a side elevational view of a portion of the door frame shown in FIG. 1 which includes a door corner portion in which the upper sash and the upright pillar sash are joined together, viewed from the vehicle interior side.

The structure of the door corner portion in which the upper sash 18 and the upright pillar sash 20 are joined together will be discussed hereinafter. The upper sash 18 generally has a uniform cross sectional shape from the front end to the door corner portion, and the rear end of the upper sash 18 is formed as a joining end surface 18K which is inclined to a plane orthogonal to the lengthwise direction of the upper sash 18. Although FIG. 4 shows a cross sectional shape of the upper sash 18 taken in the plane orthogonal to the lengthwise direction thereof, the shape of the joining end surface 18K is similar to the cross sectional shape shown in FIG. 4 as the joining end surface 18K is viewed from the rear (see FIG. 6). Neither the glass run channel 42 nor the weather strip channel 44 is provided in the door corner portion of the upright pillar sash 20; only the outer member 43 is provided. The outer member 43 is different in cross sectional shape at the door corner portion; specifically, in a joining end surface 43K of the outer member 43 shown in FIG. 5, portions thereof which are continuous with the vehicle exterior side wall 50, the base wall 51, the weather strip contacting wall 52, the vehicle interior side wall 53 and the inner peripheral wall 55 in a normal cross section shown in FIG. 3 are formed as a vehicle exterior side wall 50C, a base wall 51C, a weather strip contacting wall 52C, a vehicle interior side wall 53C and an inner peripheral wall 55C, respectively. An inclined wall 54C which is formed to be continuous with the inclined wall 54 progressively narrows in width in the upward direction (see FIG. 2) and eventually becomes the corner of the boundary between the vehicle interior side wall 53C and the inner peripheral wall 55C at the joining end surface 43K (see FIG. 5). On the other hand, the width of the vehicle interior side wall 53C progressively increases in the upward direction and becomes maximum at the joining end surface 43K (see FIG. 2).

Figure 6:
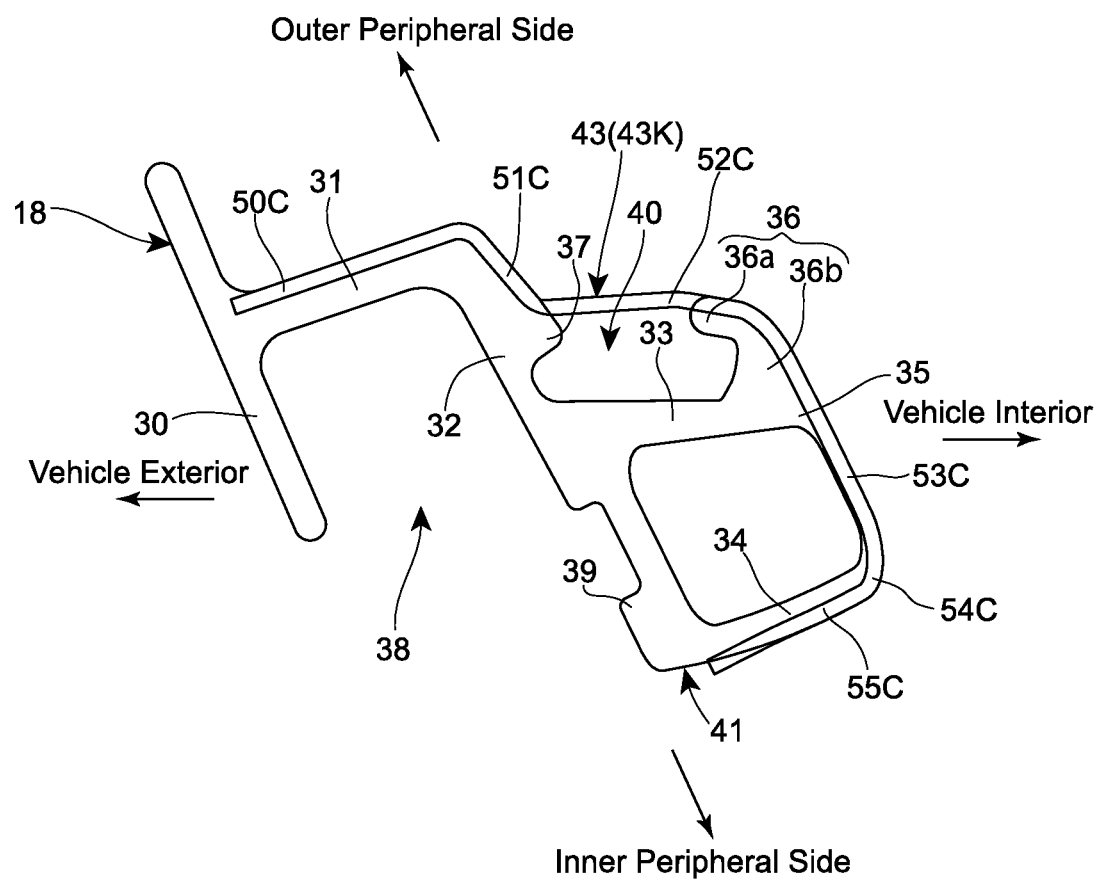
FIG. 6 is a diagram showing the positional relationship between the upper sash and the upright pillar sash in the door corner portion shown in FIG. 2.

FIG. 6 shows the positional relationship between the upper sash 18 and the upright pillar sash 20 in the door corner portion. The outer member 43 in the door corner portion has a U-shape which is open toward the vehicle exterior, and the joining end surface 43K of the outer member 43 is overlaid on the joining end surface 18K of the upper sash 18 along the outer edge thereof except the vehicle external side wall 30. More specifically, the vehicle exterior side wall 50C, the base wall 51C, the weather strip contacting wall 52C and the vehicle interior side wall 53C of the outer member 43 abut against the end surfaces of the glass-run retaining base wall 31, the central wall 32, the cantilever protrusion 36 and the vehicle interior side wall 35 of the upper sash 18, respectively. The inner peripheral wall 55C of the outer member 43 has a shape such that, although the inner peripheral wall 55C overlaps the end surface of the inner peripheral wall 34 of the upper sash 18 in the vehicle interior side base of the inner peripheral wall 55C in the vicinity of the inclined wall 54C, the inner peripheral wall 55C gradually extends away from the end surface of the inner peripheral wall 34 toward the inner peripheral side without overlapping the end surface of the inner peripheral wall 34 in a direction toward the vehicle exterior. Namely, the inner peripheral wall 55C is shaped to be angled toward the inner peripheral side at a predetermined opening angle so as to increase the distance from the weather strip contacting wall 52C in a direction from the vehicle interior side to the vehicle exterior side.

Figure 5:
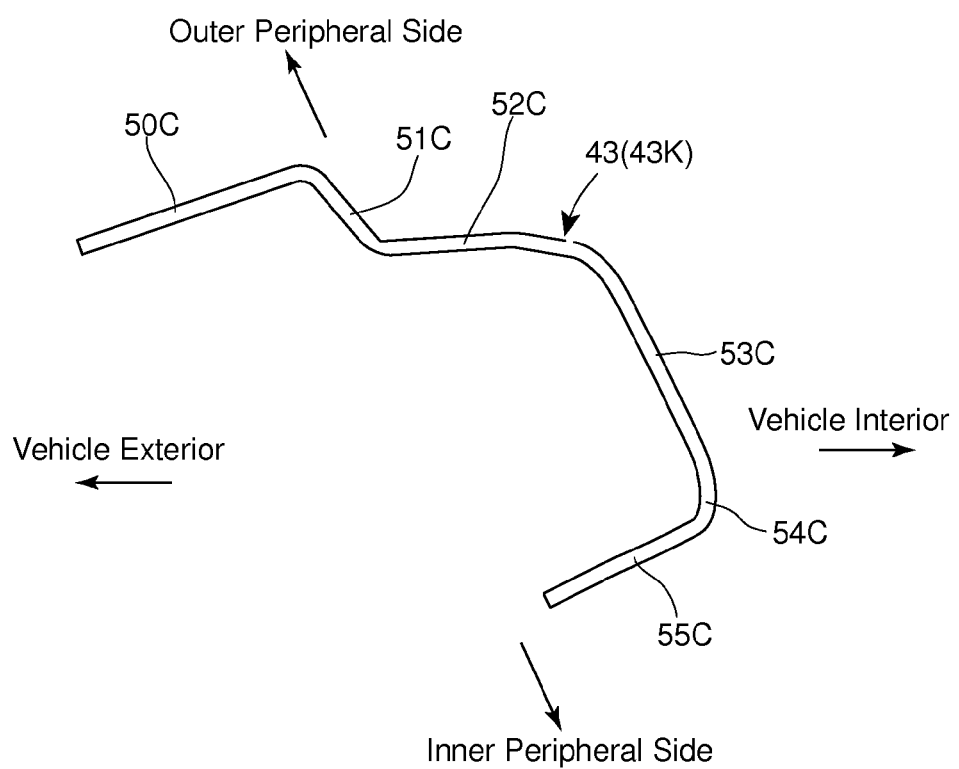
FIG. 5 is a diagram showing the shape of the end surface of the upright pillar sash in the door corner portion shown in FIG. 2.

As can be seen from FIGS. 4 through 6, in the main frame portion 41 of the upper sash 18, the inner peripheral wall 34, which is positioned on the inner peripheral side, is progressively inclined toward the outer peripheral side from the inner peripheral side in a direction from the vehicle interior side (the side on which the inner peripheral wall 34 is connected to the vehicle interior side wall 35) to the vehicle exterior side (the side at which the inner peripheral wall 34 is connected to the central wall 32). Namely, assuming an imaginary plane P (shown by one-dot chain line in FIG. 4) which is orthogonal to the vehicle interior side wall 35 that extends from the outer peripheral side to the inner peripheral side and which connects the vehicle interior side and the vehicle exterior side through the boundary between the inner peripheral wall 34 and the vehicle interior side wall 35, the inner peripheral wall 34 is shaped to be inclined at a negative angle so as to approach the weather strip retaining base wall 33 while increasing the distance from the imaginary plane P toward the outer peripheral side in a direction away from the vehicle interior side wall 35 toward the vehicle exterior.

As described above, the outer member 43 of the upright pillar sash 20 in the door corner portion has a U-shape which is open toward the vehicle exterior. In the case of forming an elongated member which is open on one side thereof like the outer member 43, it is desirable in terms of production cost and productivity that this elongated member be formed by press molding using a mold which is drawn out in the direction in which the elongated member is open. However, if the outer peripheral side wall of the outer member 43, which is composed of the vehicle exterior side wall 50C and the weather strip contacting wall 52C, and the inner peripheral side wall of the outer member 43, which is composed of the inner peripheral wall 55C, are each formed to extend in a negative-angled direction so as to reduce the distance between the outer peripheral side wall and the inner peripheral side wall of the outer member 43 in a direction away from the vehicle interior side wall 53C toward the vehicle exterior, it will be difficult to draw out the mold toward the vehicle exterior side. Provided that the inner peripheral wall 34 of the upper sash 18 is negative-angled relative to the image plane P and that the inner peripheral wall 55C is shaped to extend totally alongside the inner peripheral wall 34, the inner peripheral wall 55C will be negative-angled with reference to the vehicle interior side wall 53C, which prevents the mold from being drawn out toward the vehicle exterior side. Conversely, in the present embodiment, the outer member 43 has a cross sectional shape such that the inner peripheral wall 55C is not negative-angled to thereby enable the mold to be drawn out toward the vehicle exterior side by the above described structure of the outer member 43 in which the inner peripheral wall 55C overlaps the end surface of the inner peripheral wall 34 in a vehicle interior side area of the inner peripheral wall 55C in the vicinity of the inclined wall 54C and in which the inner peripheral wall 55C gradually extends away from the end surface of the inner peripheral wall 34 toward the inner peripheral side without overlapping the end surface of the inner peripheral wall 34 in any other area of the inner peripheral wall 55C which is closer to the vehicle exterior.

Figure 7:
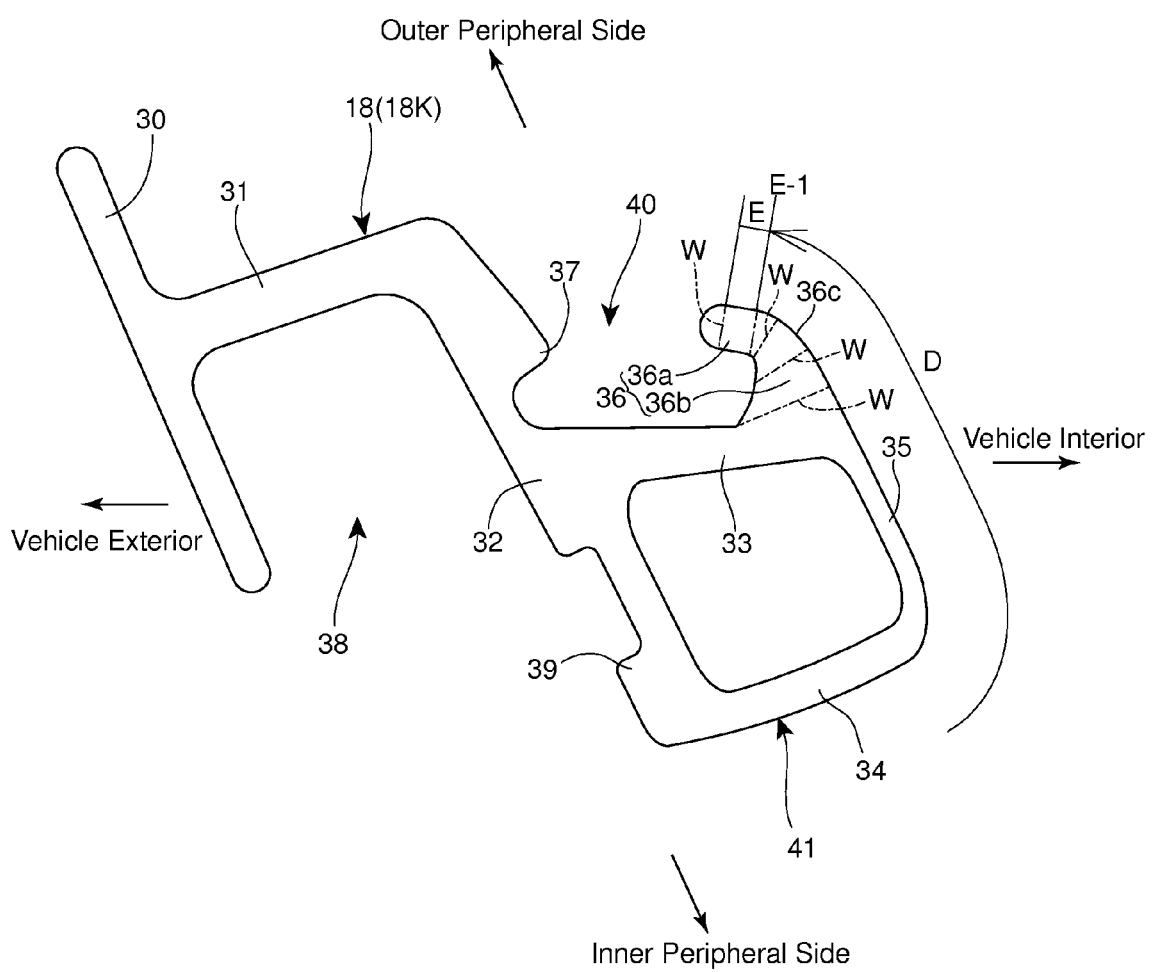
FIG. 7 is a diagram showing the welding region between the upper sash and the upright pillar sash in the door corner portion shown in FIG. 2.

The upper sash 18 and the outer member 43 are fixed to each other by butting and joining the joining end surfaces 18K and 43K together by welding along the periphery of the joining end surfaces 18K and 43K. In FIG. 7, "D" represents a part of the welding region on the upper sash 18. The overlapping region is entirely welded at each join between the glass-run retaining base wall 31 and the vehicle exterior side wall 50C, between an upper portion of the central wall 32 and the base wall 51C, and between the vehicle interior side wall 35 and the vehicle interior side wall 53C. The overlapping region in the vicinity of the vehicle interior side wall 35 and the vehicle interior side wall 53C is welded at the connecting region between the inner peripheral walls 34 and 55C, while the remaining region (non-overlapping region) is not welded. In addition, end surfaces of the cantilever protrusion 36 and the weather strip contacting wall 52C overlap each other; however, a predetermined range of the cantilever protrusion 36 in the vicinity of the front end thereof is not welded to the weather strip contacting wall 52C.

The details of the weld joining between the upper sash 18 and the upright pillar sash 20 will be discussed hereinafter. The cantilever protrusion 36 of the upper sash 18 is in the shape of a cantilever, the leading end of which is a free end. The cantilever protrusion 36 has a constant wall thickness in a region E thereof shown in FIG. 7, and the free end portion of the cantilever protrusion 36 that extends from this region E toward the vehicle exterior (leftward with respect to FIG. 7) has a rounded tapered shape (tapered leftward with respect to FIG. 7). The base end (fixed end) portion of the cantilever protrusion 36 that extends from the region E in a direction away from the free end portion progressively increases in thickness toward the boundary between the weather strip retaining base wall 33 and the vehicle interior side wall 35 and is connected to the main frame portion 41 (to the boundary between the weather strip retaining base wall 33 and the vehicle interior side wall 35). A portion on the free end side, having a base end position E-1 of the region E as its boundary, of the cantilever protrusion 36 (left side with respect to FIG. 7) is referred to as a narrow width portion (leading end portion) 36a, and another portion on the base end side, also having the base end position E-1 of the region E as its boundary, of the cantilever protrusion 36 (right side with respect to FIG. 7) is referred to as a width widening portion (base portion) 36b. The width widening portion 36b is shaped to increase in wall thickness progressively toward the main frame portion 41 due to the need for the width widening portion 36b to be shaped to connect to main frame portion 41 while being curved. More specifically, with reference to a vehicle interior side surface 36c of the cantilever protrusion 36 (see FIGS. 4 and 7), if the width W (see FIG. 7) of the cantilever protrusion 36 is set in a direction orthogonal to the vehicle interior side surface 36c, the width W in the width widening portion 36b progressively increases toward the base end side away from the region E (the narrow width portion 36a). The welding region D of the upper sash 18 does not include the narrow width portion 36a of the cantilever protrusion 36, and a portion of the upper sash 18 which extends from a region of the main frame portion 41 along the vehicle interior side wall 35 to the width widening portion 36b of the cantilever protrusion 36 is defined as the welding region D. Accordingly, the base end position E-1 that defines the boundary between the narrow width portion 36a and the width widening portion 36b corresponds to an end (starting point or endpoint) of the welding region D. The other end of the welding region D is determined at the aforementioned overlapping region between the inner peripheral wall 34 and the inner peripheral wall 55C.

In this manner, the narrow width portion 36a, which is positioned on the free end side of the cantilever protrusion 36 that protrudes from the main frame portion 41 of the upper sash 18, is excluded from the welding region D. The narrow width portion 36a of the cantilever protrusion 36 is smaller in wall thickness than the width widening portion 36b and thus susceptible to being adversely influenced by high temperatures generated thereat at the time of welding; however, burn-through of the cantilever protrusion 36 which may be caused by high heat generated at the time of welding can be prevented from occurring by excluding the narrow width portion 36a from the welding region D. Although it is possible for the entire cantilever protrusion 36 not to be welded to weather strip contacting wall 52C at all, in order to prevent the cantilever protrusion 36 from being adversely influenced by high temperatures generated during welding, since the width widening portion 36b of the cantilever protrusion 36 has a large wall thickness and thus not susceptible to being adversely influenced by high temperatures, inclusion of the width widening portion 36b in the welding region D makes it possible to enhance the joining strength between the upper sash 18 and the upright pillar sash 20 in comparison with the case where the entire cantilever protrusion 36 is not welded to weather strip contacting wall 52C at all. On condition that narrow width portion 36a is excluded from the welding region D, the upper sash 18 and the upright pillar sash 20 can be joined together by welding at points outside the welding region D in accordance with the required strength (e.g., at the joined portion between the glass-run retaining base wall 31 and the vehicle exterior side wall 50C and the joined portion between the central wall 32 and the bottomed wall 51C).

Figure 8:
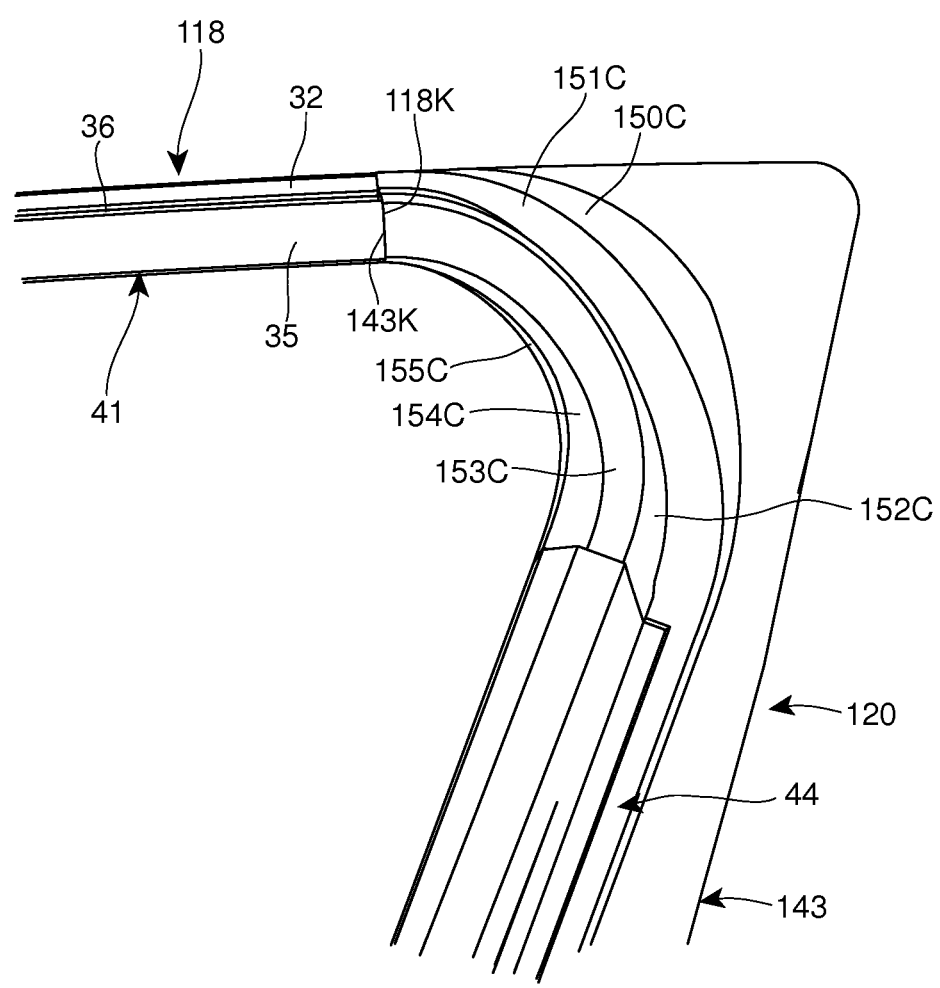
FIG. 8 is an enlarged side elevational view of a portion of another embodiment of the door frame structure in the vicinity of the door corner portion.
Figure 9:
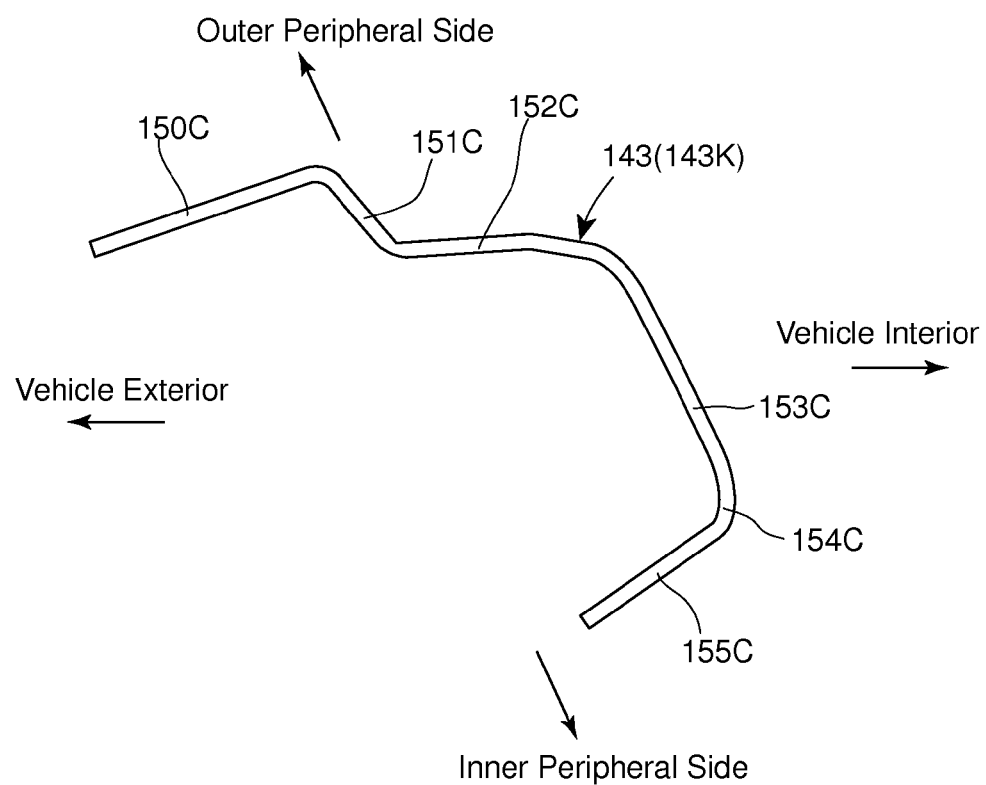
FIG. 9 is a diagram showing the shape of the end surface of the upright pillar sash in the door corner portion shown in FIG. 8.
Figure 10:
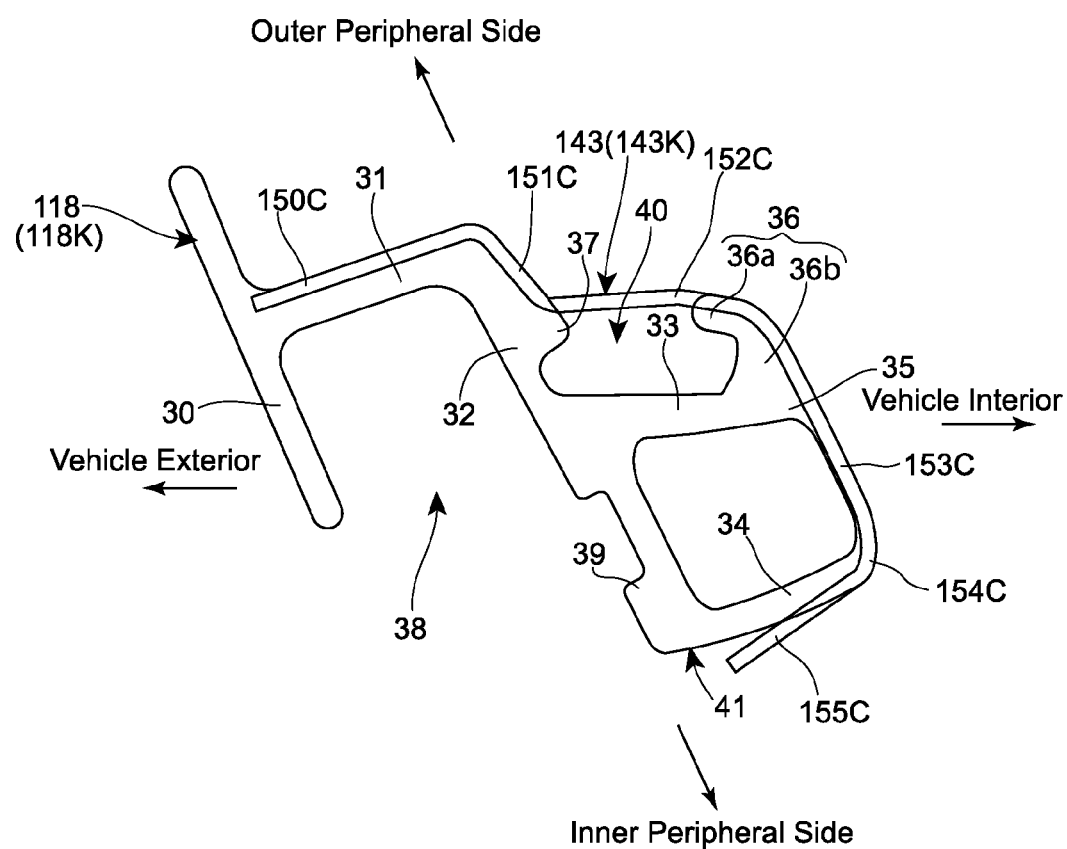
FIG. 10 is a diagram showing the positional relationship between the upper sash and the upright pillar sash in the door corner portion shown in FIG. 8.

FIGS. 8 through 10 show another embodiment of the door frame structure. The joint configuration in the door corner portion between an upper sash 118 and an upright pillar sash 120 in this embodiment of the door frame structure which respectively correspond to the upper sash 18 and the upright pillar sash 20 is different from that between the upright pillar sash 18 and the upper sash 20 in the previous embodiment of the door frame structure. Joining end surfaces 118K and 143K of the upper sash 118 and the upright pillar sash 120 which are butted and joined together are each formed as a surface which extends in a plane that is orthogonal to the lengthwise direction of the upper sash 118. The joining end surface 118K of the upper sash 118 has a different cutting direction from the joining end surface 18K of the upper sash 18 of the previous embodiment; however, the joining end surface 118K is substantially identical in shape to the joining end surface 18K as viewed from the rear, so that in FIG. 10 portions of the joining end surface 118K of the upper sash 118 which correspond to those of the joining end surface 18 of the upper sash 18 in FIG. 6 are designated by the same reference numerals.

The upright pillar sash 120 is provided with an outer member 143 which corresponds to the outer member 43 of the previous embodiment. A portion of the outer member 143 of the upright pillar sash 120 in the vicinity of the upper end thereof is curved to extend forward (to the left with respect to FIG. 8), and the joining end surface 143K of the outer member 143 of the upright pillar sash 120 that is butted to the joining end surface 118K of the upper sash 118 has the shape shown in FIGS. 9 and 10. The joining end surface 143K of the outer member 143 has portions corresponding to portions of the outer member 43K of the outer member 43 of the previous embodiment; more specifically, with a vehicle interior side wall 153C of the outer member 143K (which corresponds to the vehicle interior side wall 53C of the outer member 43K) as a reference on the vehicle interior side, the joining end surface 143K of the outer member 143 is provided with a weather strip contacting wall 152C, a base wall 151C and a vehicle exterior side wall 150C which extend toward the vehicle exterior from the outer peripheral side end of the vehicle interior side wall 153C, and the joining end surface 143K of the outer member 143 is further provided with an inner peripheral wall 155C which extends toward the vehicle exterior from an inclined wall 154C which is continuous with the inner peripheral side end of the of the vehicle interior side wall 153C. Similar to the inner peripheral wall 55C of the previous embodiment, the inner peripheral wall 155C is inclined to increase the distance from the vehicle exterior side wall 150C, the base wall 151C and the weather strip contacting wall 152C in a direction from the vehicle interior side to the vehicle exterior side to allow the mold to be drawn out toward the vehicle exterior side when the outer member 143 is molded. The inner peripheral wall 155C is shaped to be angled toward the inner peripheral side at an opening angle greater than the opening angle of the inner peripheral wall 55C of the previous embodiment, so that the entirety of the inner peripheral wall 155C does not overlap the inner peripheral wall 34 of the upper sash 118. In the present embodiment shown in FIGS. 8 through 10, in which the upper sash 118 and the upright pillar sash 120 are joined to each other at the joining end surfaces 118K and 143K, each of which extends in a plane that is orthogonal to the lengthwise direction of the upper sash 118, it is effective to form the joining end surface 143K into a shape having the inner peripheral wall 155C, which is angled toward the inner peripheral side at a large opening angle with respect to the vehicle interior side wall 153C.

In the embodiment shown in FIGS. 8 through 10 also, the narrow width portion 36a, which is positioned on the free end side of the cantilever protrusion 36 that constitutes an element of the upper sash 118, is excluded from the welding region D on the upright pillar sash 120. This makes it possible to secure a predetermined joining strength between the upper sash 118 and the upright pillar sash 120 and to prevent burn-through of the cantilever protrusion 36, which may be caused by a high temperature generated at the time of welding.

Figure 11:
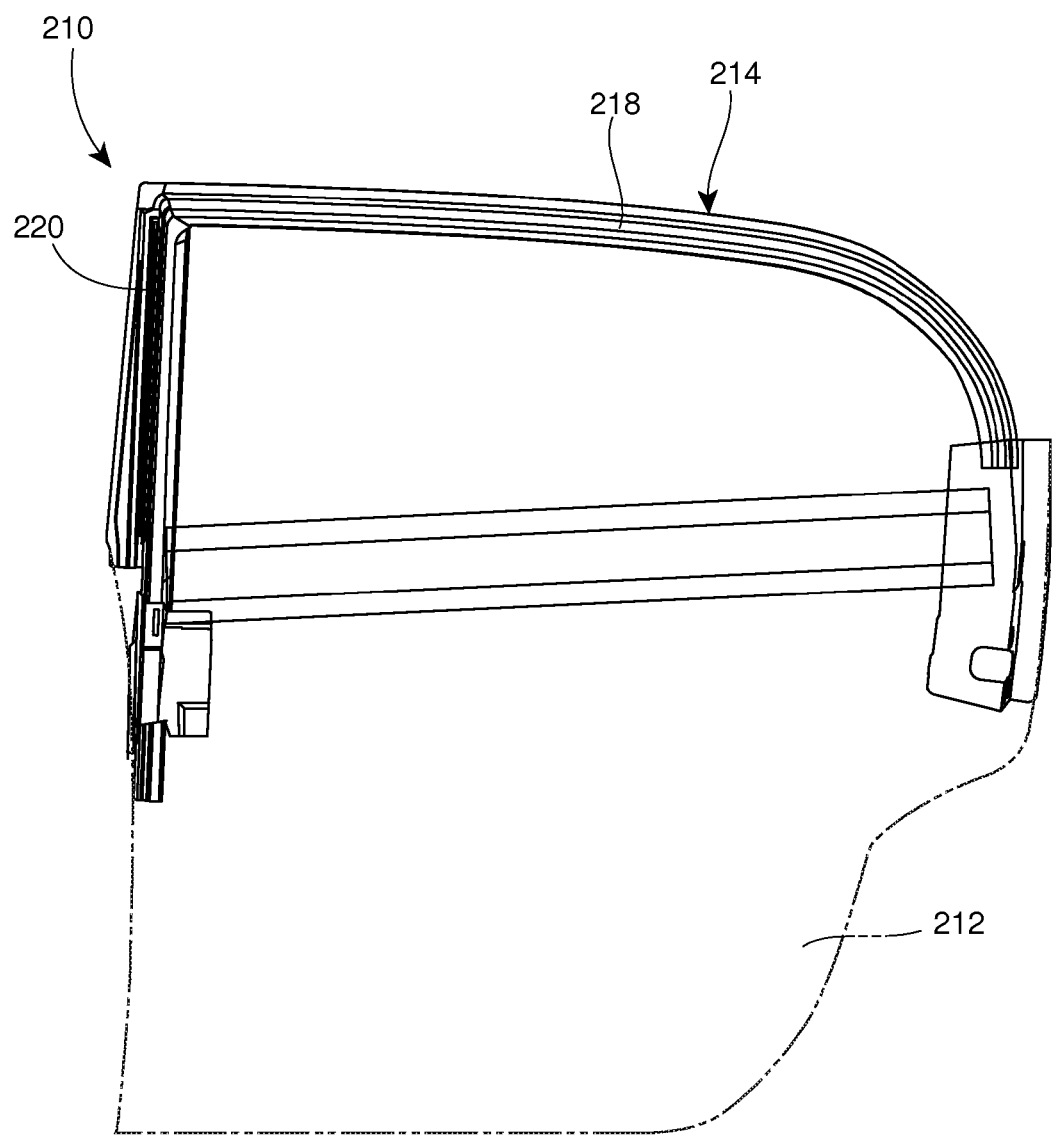
FIG. 11 is a side elevational view of a motor-vehicle side door for use as a rear seat door, to which a vehicle door frame structure according to the present invention has been applied, viewed from the vehicle interior side.

Although the present invention has been applied to the motor-vehicle side door 10 for use as a front-seat door in each of the above described embodiments of the door frame structures, the present invention can also be applied to other doors such as a motor-vehicle side door 210 for use as a rear seat door shown in FIG. 11. The door 210 is provided with a door panel 212 and a door frame 214. The door frame 214 is provided with an upper sash 218 which forms the upper edge of the door 210 and an upright pillar sash (side sash) 220 which is formed to extend substantially vertically upwards from the front of the door panel 212. The upper sash 218 and the upright pillar sash 220 are joined together in a door corner portion (upper left corner portion with respect to FIG. 11) with the front end surface the upper sash 218 and the upper end surface of the upright pillar sash 220 butted to each other. The present invention can also be applied to the joining structure between the upper sash 218 and the upright pillar sash 220 of the door 210, though the detailed description of this joining structure is omitted since the joining structure between the upper sash 218 and the upright pillar sash 220 of the door 210 is substantially the same as that between the upper sash 18(118) and the upright pillar sash 20(120) of the door 10, for use as a front-seat door.

Although the present invention has been described based on the above illustrated embodiments, the present invention is not limited solely to these particular embodiments; various modifications to the above illustrated embodiments is possible without departing the spirit and scope of the present invention. For instance, the elements of each embodiment of the door frame described above are each made of aluminum, the present invention is also applicable to a door frame made of a different material such as iron.

In addition, since the cantilever protrusion 36 is formed on the upper sash 18(118) in each of the above illustrated embodiments, it is possible to provide the upright pillar sash 20(120) with a cantilever protrusion similar to the cantilever protrusion 36 and to exclude a part of the free end portion of this cantilever protrusion from the welding region.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A door frame structure of a vehicle door which includes an upright pillar sash that extends in a substantially vertical direction and an upper sash that forms an upper edge of said vehicle door, wherein terminal ends of said upright pillar sash and said upper sash are butted against each other and welded,
wherein said upper sash comprises:
a frame body portion; and
a cantilever protrusion which protrudes from said frame body portion so that a leading end of said cantilever protrusion is a free end,
wherein said upright pillar sash comprises:
an outer member portion having a shape to enclose said frame body portion and said cantilever protrusion,
wherein said cantilever protrusion formed on said upper sash is butted against said outer member, and welded along a periphery of said terminal ends to form a welding region,
wherein said welded region at the terminal ends of said upright pillar sash and said upper sash includes a base portion of said cantilever protrusion which is connected to said frame body portion, and
wherein said welded region at the terminal ends of said upright pillar sash and said upper sash excludes a leading end portion of said cantilever protrusion which is positioned on said leading end.

2. The door frame structure according to claim 1, wherein said leading end portion comprises a narrow width portion, and said base portion comprises a width widening portion which increases in wall thickness from said narrow width portion toward a portion of said cantilever protrusion which is connected to said frame body portion.

3. The door frame structure according to claim 1, wherein said at least one of said upright pillar sash and said upper sash that comprises said cantilever protrusion is made of aluminum.

4. The door frame structure according to claim 1, wherein said frame body portion comprises a tubular portion having a closed cross sectional shape.

5. The door frame structure according to claim 1, wherein said cantilever protrusion constitutes an element of a weather strip retaining portion which retains a weather strip that is supported on a rim of said door frame.

6. The door frame structure according to claim 1, wherein said upper sash comprises said cantilever protrusion.

7. The door frame structure according to claim 1, wherein the width of the base portion of said cantilever protrusion increases in wall thickness from the narrow width portion toward a portion of the cantilever protrusion which is connected to the frame body portion.

8. The door frame structure according to claim 1, wherein said cantilever protrusion is continuous with a vehicle interior side wall.

9. The door frame structure according to claim 1, wherein said leading end portion and said base portion of said cantilever protrusion define a bent section.

10. The door frame structure of a vehicle according to claim 2, wherein said narrow width portion of said leading end portion and said width widening portion of said base portion define a bent section.

11. The door frame structure of a vehicle according to claim 2, wherein said narrow width portion comprises a constant-thickness section and a tapering section.

12. The door frame structure of a vehicle according to claim 11, wherein said constant-thickness section has a linear shape.

13. The door frame structure of a vehicle according to claim 4, wherein said cantilever protrusion is formed as a continuous and adjacent extension from a common part of said tubular portion with that of a vehicle interior side wall.

14. A door frame structure of a vehicle door which includes an upright pillar sash that extends in a substantially vertical direction and an upper sash that forms an upper edge of said vehicle door, wherein terminal ends of said upright pillar sash and said upper sash are butted against each other and welded,
wherein said upper sash comprises:
a frame body portion; and
a cantilever protrusion which protrudes from said frame body portion so that a leading end of said cantilever protrusion is a free end,
wherein said upright pillar sash comprises:
an outer member portion having a shape to enclose said frame body portion and said cantilever protrusion,
wherein a welded region at the terminal ends of said upright pillar sash and said upper sash includes a base portion of said cantilever protrusion which is connected to said frame body portion, and
wherein said welded region at the terminal ends of said upright pillar sash and said upper sash excludes a leading end portion of said cantilever protrusion which is positioned on said leading end.

15. A door frame structure of a vehicle door which includes an upright pillar sash that extends in a substantially vertical direction and an upper sash that forms an upper edge of said vehicle door, wherein joining end surfaces of said upright pillar sash and said upper sash are butted and joined together by welding along a periphery of said joining end surfaces,
wherein at least one of said upright pillar sash and said upper sash comprises:
a frame body portion; and
a cantilever protrusion which protrudes from said frame body portion so that a leading end of said cantilever protrusion is a free end, the joining end surface of said one of said upright pillar sash and said upper sash partly including said frame body portion and said cantilever protrusion,
wherein said upright pillar sash and said upper sash are welded to each other along said frame body portion and a base portion of said cantilever protrusion which is connected to said frame body portion,
wherein a leading end portion of said cantilever protrusion which is positioned on said leading end is not welded,
wherein said leading end portion comprises a narrow width portion, and said base portion comprises a width widening portion which increases in wall thickness from said narrow width portion toward a portion of said cantilever protrusion which is connected to said frame body portion, and
wherein said narrow width portion comprises a constant-thickness section and a tapering section.

* * * * *